United States Patent [19]

Hoover et al.

[11] Patent Number: 5,656,144

[45] Date of Patent: Aug. 12, 1997

[54] ION EMPLASEMENT IN SOIL WITH CHIM ELECTRODES

[75] Inventors: Donald B. Hoover; Reinhard W. Leinz, both of Arvada, Colo.

[73] Assignee: The United States of America as represented by the Secretary of the Interior, Washington, D.C.

[21] Appl. No.: 476,926

[22] Filed: Sep. 7, 1995

Related U.S. Application Data

[63] Continuation-in-part of Ser. No. 169,234, Dec. 20, 1993, abandoned.

[51] Int. Cl.$^6$ ..................................... B01D 61/42
[52] U.S. Cl. ..................... 204/515; 204/516; 204/517; 205/687; 205/742; 205/746; 205/771; 205/772
[58] Field of Search .................... 204/400, 435, 204/515–517; 205/687, 742, 771, 772, 746–750

[56] References Cited

U.S. PATENT DOCUMENTS 2,636,852  4/1953  Juda et al. ........................ 204/435
3,505,196  4/1970  Dahms ............................. 204/435
5,074,986  12/1991  Probstein et al. ................ 204/130
5,405,509  4/1995  Lomansney ...................... 205/742

OTHER PUBLICATIONS

Smith et al, "Preliminary Studies of the CHIM Electrochemical Method at the Kokomo Mine, Russell Gulch, Colorado", *J. of Geochemical Exploration*, 46 (1993) pp. 257–278.

*Primary Examiner*—T. Tung
*Attorney, Agent, or Firm*—E. Philip Koltos

[57] ABSTRACT

An apparatus and method for soil remediation replaces specific ions in the soil electrochemically, using a DC voltage source and special multicompartment anodes and cathodes, each comprising an inner compartment containing electrolyte and a submerged electrode, a salt bridge connecting the electrolyte to an outer compartment containing a specific solution with replacement ions for soil remediation, and a membrane holding in the replacement solution. The membrane is put into contact with the soil, allowing electrical contact and ion migration while keeping the solution inside the anode or cathode. The multicompartment structure prevents the hydroxide and hydronium ion emplacement that causes acid and base fronts to form.

4 Claims, 1 Drawing Sheet

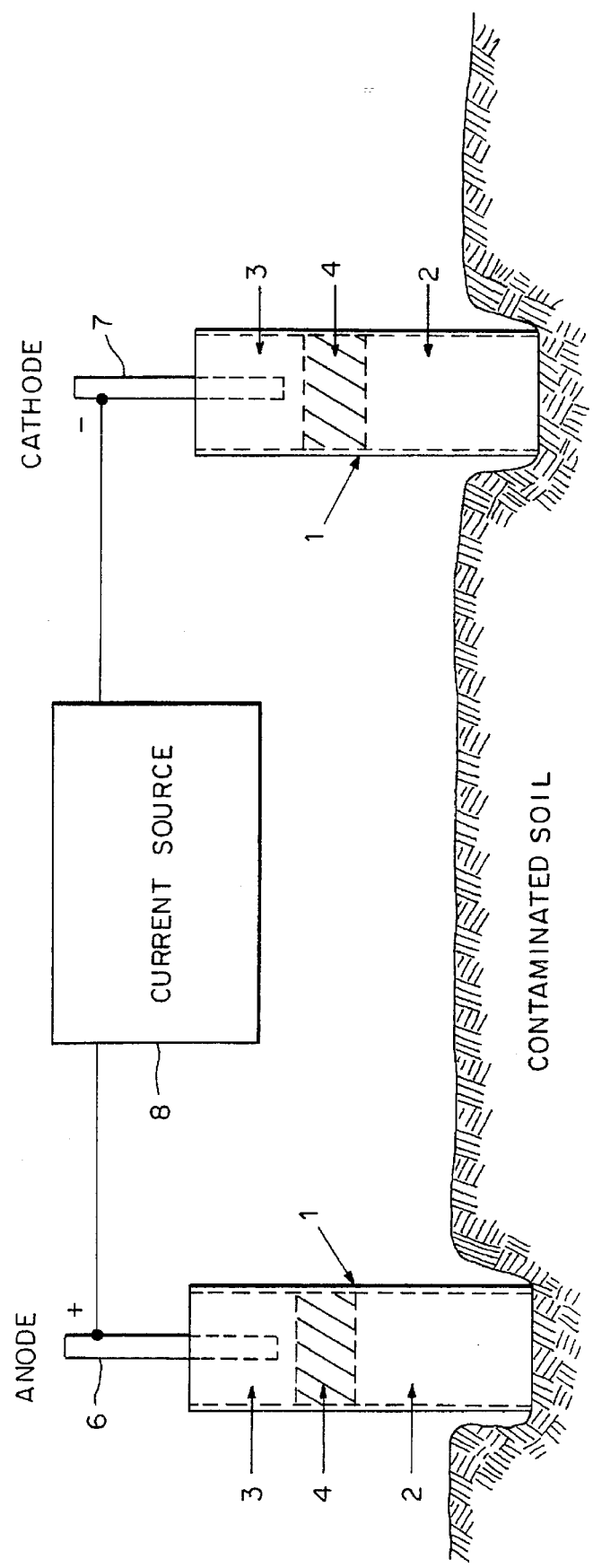

ION EMPLASEMENT IN SOIL WITH CHIM ELECTRODES

CROSS-REFERENCE TO RELATED APPLICATION

This application is a continuation-in-part of application Ser. No. 08/169,234, filed Dec. 20, 1993, now abandoned, entitled "Multicompartment CHIM Electrode". The inventorship of the present application is the same as the inventorship of the parent application Ser. No. 08/169,234.

FIELD OF THE INVENTION

The field of the present invention is environmental remediation through electrochemical transformation.

DESCRIPTION OF THE RELATED ART

Soil remediation has been accomplished by various means, including soil removal and treatment such as washing or vitrification. Hot plasma methods for vitrification of soil use extremely large amounts of energy, in order to produce a glass that immobilizes less volatile hazardous elements. It would not be effective on elements, such as mercury, which would volatize. The glass formed also may be soluble enough to release hazardous metals at a greater rate than from precipitates of the metals formed by other means.

In situ methods have also been used, including electrical methods which have been used for many years to modify soil properties, principally through electroosmosis for dewatering and stabilization of soils. Electroosmosis, is the process of moving liquid through porous materials with an electric field. Casagrande (Casagrande, L., 1949, Electroosmosis in soils: Geotechnique, v. 1, p. 1959–1977) reviews the early literature on this subject. Recently, with the heightened interest in environmental remediation, electrical techniques, especially electroosmosis, are receiving significant attention as potential means for remediation of hazardous waste sites (Pamukou, S., and Witttle, J. K., 1992, Electrokinetic removal of selected heavy metals from soil: Environmental Progress, v. II, no. 3, p. 241–250; Probstein, R. F., and Hicks, R. E., 1993, Removal of contaminants from soils by electric fields: Science, v. 260, p. 498–503; Runnels, D. P., and Wahli, C., 1993, In-situ electromigration as a method for removing sulfate, metals, and other contaminants from ground water: Ground Water Monitoring and Remediation, v. 53, no. 1, p. 121–129; Acar, Y. B., Alshawabkeh, A. N. and Gale, R. J., 1993, Fundamentals of extracting species from soils by electrokinetics: Waste Management, v. 13, p. 241–151; Acar, Y. B., and Alshawabkeh, A. N., 1993, Principles of electrokinetic remediation: Environmental Science of Technology, v. 27, no. 13, p. 2638–2647; Shapiro, A. P., and Probstein, R. F., 1993, Removal of contaminants from saturated clay by electroosmosis: Environmental Science of Technology, v. 27, no. 2, p. 282–291; and U.S. Pat. No. 5,074,986). Other energy intensive electrical methods involve plasma fusion, or cold plasma destruction. Other remedial methods for contaminated soils generally consist of excavation, and transportation to an approved landfill. At times excavated soils may be treated prior disposal by washing or incineration. In-situ treatment has obvious advantages, and is now receiving increased research support. Of the in-situ methods electrokinetic decontamination is said to be one of the most promising by Pamukcu and Wittle. Simple pumping of fluids from contaminated sites may be-used, and may by accompanied by flushing with water. For volatile organics, a gas, such as air, may be used in this pump and flush mode. However, these measures are effective primarily in the permeable zone of a waste site and will not effectively remove substances from zones that cannot be reached by flushing with liquid or gas.

All of the published work on remediation by electrokinetic methods has focused on the removal of substances from soils using simple metallic anodes and cathodes for electrical connection to the earth. In electroosmostic decontamination a liquid such as water is supplied to one electrode (usually the anode) to act as a purge fluid and contaminants are removed at the other electrode (usually the cathode), as disclosed in U.S. Pat. No. 5,074,986. However, in this process hydroxyl ions generated at the cathode, and hydroniumions at the anode enter the soil and create moving acid and base fronts that interact with soil components significantly complicating the remediation process, and may immobilize hazardous components at some intermediate distance from the anode and cathode. Problems and benefits relating to the generation of acid and base fronts in the soil are discussed by Pamukou and Wittle, Runnells and Wahli, Oscar and Alshawabkeh, and Probstein and Hicks. Problems of electrical remediation technologies are discussed in U.S. Pat. No. 5,074,986.

Other than dewatering of clay soils by electroosmosis, the prior art does not disclose processes that may be used to modify clay or soil properties by controlled introduction of specific ions.

Heretofore un-related to the removal of contaminants for remediation is the Russian-developed electrogeochemical exploration method "CHIM" (Chastlchnoe Izvlechennye Metalloy, or partial extraction of metals), in which ions of interest minerals or oil and gas exploration are electrically extracted from soils (Leinz, R. W., and Hoover, D. B., 1993, The Russian CHIM method—electrically or diffusion driven collection of ions?: Explore, no. 79, p. 1, 5–9; Leinz, R. W., and Hoover, D. B., 1994, Ideal CHIM with the newly developed NEOCHIM electrode: Explore, no. 83, p. 10–15; Smith, D. B., Hoover D. B., and Sanzalone, R. F., 1993, Preliminary studies of the CHIM electrogeochemical method at the Kokomo Mine, Russell Gulch, Colo.: Journal of Geophysical Exploration, v. 46, p. 257–278; Hoover, D. B. and Smith, D. B., 1993, Geochemical prospecting—The Chim method: McGraw Hill Yearbook of Science and Technology 1994: McGraw Hill Inc., p. 1188–191). In this technique special fluid filled electrodes are used to collect ions of interest from the soil by means of electromigration of charged ions.

The Russian developers of the method recognized the problem that acid and base fronts moving into the earth would present if neutral electrolytes were used as a collection electrolyte. Their solution was to use acid of 1–4 N strength in the cathode. Little is said about anode extraction in the Russian literature; presumably a base was used. This, however, introduced other problems that significantly affected the collection of ions.

SUMMARY OF THE INVENTION

These problems were remedied by development of a new type of electrode by the applicants at, the U.S. Geological Survey. This new electrode is described in co-pending U.S. patent application, Ser. No. 08/169,234 Multicompartment CHIM Electrode, filed Dec. 20, 1993. The new electrode described therein is used in the present invention.

The USGS electrode is a multicompartment CHIM electrode for sampling ions in soil comprising an inner compartment containing an electrolyte, an electrode positioned in the inner compartment and at least partially submerged in the electrolyte, an outer compartment, and a salt bridge separating the inner compartment from the outer compartment.

In a first configuration, the inner compartment and the salt bridge are contained in a single chamber. A membrane is positioned at a base of the chamber to retain the salt bridge and the chamber is partially submerged in the outer compartment.

In a second configuration, the inner compartment, salt bridge and outer compartment are stacked in a single chamber.

In another embodiment the multicompartment CHIM electrode comprises an inner compartment having an electrolyte, an electrode positioned in the inner compartment, and a salt bridge separating the inner compartment from ground. In this embodiment, the outer compartment is eliminated.

The salt bridge and the inner compartment may be contained in a single chamber which is partially submerged in the solution in the outer compartment.

A membrane positioned at a base of the chamber can be used, or the salt bridge and outer compartment stacked in a single chamber. The salt bridge may comprise a gel for preventing ion transport by means other than diffusion and migration by an electric field. The solution in the outer compartment may be a neutral salt solution that my contain ion exchange resin. The multicompartment electrode alternatively includes an inner compartment containing an electrolyte, an electrode at least partially submerged in the electrolyte; a salt bridge separating the inner compartment from the soil; and a membrane positioned between the salt bridge and the soil; or, electrode and the soil.

The invention uses the improved CHIM electrodes to introduce selected ion into soils or other earth materials to either immobilize hazardous materials in place, or to mobilize them and keep them mobile permitting their collection by electromigration into suitable CHIM collection electrodes. Where hazardous materials are immobilized they may be left in place, or if further treatment is required this permits treatment of smaller volumes of soil than if the hazardous materials were free to move. For materials mobilized and collected they are in a form more amenable to disposal. For example $(SO_4)^{-2}$ ions can be introduced to immobilize lead ions by precipitation of anglesite ($PbSO_4$), a relatively insoluble mineral. Or, ($NO_3$) ions may be introduced to keep metal ions in solutions (most nitrates are soluble), or to act as a nutrient for bacteria that feed on and degrade hazardous materials.

The invention may also be used to change properties of clay materials of soils, in situ, to assist in stabilization of landslides, or in stabilization of clays, to increase the dispersibility of clay soils by substitution with $Na^+$ ions, or release hazardous ions from clays for later collection.

BRIEF DESCRIPTION OF THE DRAWING

The above and other objects and the nature and advantages of the present invention will become more apparent from the following detailed description of an embodiment[s] taken in conjunction with drawings, wherein:

FIG. 1 is a schematic view of the invention.

DETAILED DESCRIPTION OF THE PREFERRED EMBODIMENT

This invention relates to a process for the controlled introduction of charged ionic species into the ground for environmental remediation of earth materials, and for changing soil properties in a predictable way. A specific embodiment of this invention is shown in FIG. 1. The electrode 1 consists of three parts, an electrolyte chamber 2 in which a specific electrolyte composition is placed, the electrolyte containing ions designed for specific reaction with soil materials, an inner electrolyte chamber 3 with an electrodes 6 and 7 therein where electrode reaction products accumulate, and a salt bridge 4 to isolate chamber 3 from chamber 2.

This would be the same configuration that could be used in collecting a CHIM sample for exploration or for removal of ions from the soil. In the present invention the same process is used to purposely introduce carefully selected ions into the soil, not necessarily to remove ions. A natural consequence of electromigration of ions out of the soil in a CHIM extraction is the electromigration of similar quantities of counter ions out of the CHIM electrode into the soil. Electrode pairs including an anode 6 and a cathode 7 are connected to a source of direct current 8 and voltage is applied. The magnitude of applied voltage is dependant on the resistivity of the earth, local electrode contact resistance, and the desired operating current. Operating time is determined by Faradays law, and the number of chemical equivalents needed to be implanted in the soil for replacement of those other varieties present.

Particular ions to be introduced into soils for remediation will be dependent on the soil composition and the particular hazardous compounds present. As an example, if $CuSO_4$ is present in the soil, the problem might be to immobilize the copper and sulfate ions to prevent them from moving. In this case, in the cathode electrolyte of the CHIM electrode one could use $Na_2CO_3$ and in the anode compartment $CaCl_2$. As d.c. current is passed through the electrodes, the $Cu^{+2}$ in the soil starts to migrate to the cathode and the $(SO_4)^{-2}$ to the anode. However, at the same time $(CO_3)^{-2}$ migrates out of the cathode and precipitates $Cu_2CO_3$ or one of the basic copper carbonates, depending on soil pH and EH in the soil near the cathode. At the anode the $Ca^{+2}$ migrates out and precipitates $CaSO_4$ in the soil near the anode. This process will continue as long as the appropriate ions are available in the electrodes, and until all $Cu^{+2}$ and $(SO_4)^{-2}$ ions are precipitated in the soil. At completion, the soil containing the precipitated compounds can be excavated and disposed of in a conventional manner, or left in place if long term dissolution presents no problem. Alternatively, if NaCl is sued as the working electrolyte in both anodes and cathodes, then at the cathode $Cl^{-1}$ ions will migrate into the soil and at the anode $Na^+$ ions will migrate out of the electrode into the soil. In this case the $Cl^{-1}$ ions will not precipitate $Cu^{+2}$ nor the $Na^+$ ions precipitate the $(SO_4)^{-2}$. The copper and sulfate ions will instead move to the cathodes and anodes, respectively and be collected. This process has the effect of replacing all compounds present in the soil with sodium chloride.

Extraction of $CuSO_4$ using simple electrodes is discussed by Runnells and Wahli (1993) where the problems related to the acid front are detailed. The applicants CHIM technology can be used to mitigate the problem of acid and base fronts the provision of the salt bridge between the chambers of the electrode. The salt bridge prevents migration of undesirable anions, such as hydroxide ions, and cations from migrating from chamber 3 to chamber 2 of FIG. 1, as set forth in parent application Ser. No. 08/169,234.

The primary electrical parameter of importance is the charge (current×time) expended. Under ideal conditions, for each Faraday of charge one equivalent of ions will be introduced into the soil. Thus one can use a larger current for a shorter time to speed up the process. The practical current, however, will be limited by resistive heating of the soil at the electrode where current densities are high, and the cost due to higher power requirement as applied voltage is increased to obtain higher current. Based on applicant's tests, current densities of about 0.05 A (amperes) per $cm^2$ of active electrode area are practical. Exact values are dependent on soil characteristics and electrolytes used.

For environmental applications, generally a concentrated solution would be used as this provides a large quantity of ions in a relatively small volume of electrode solution. For any application, diffusion processes which tend to leak ions into the soil will have to be considered.

The number and position of electrodes, both on the surface or within drill holes can be arranged so as to constrict the bulk of the current flow to regions of soil or earth containing hazardous materials. Theory for doing this is well developed in the geophysical literature.

CHIM electrodes may also be used to introduce specific nutrients or mixes of nutrients into waste-contaminated soil to enhance the growth of organisms that feed on and destroy hazardous materials. The nutrient material must be in the form of ions or charged particles so that it can be mobilized and transported by the applied electric field.

The invention may be used to alter earth properties for other purposes. For example, the dispersibility or cohesion of clay soils is strongly dependent on the type of cation present (Mitchell, J. K., 1976, Fundamentals of soil behavior: John Wiley and Sons, New York, 422). The presence of monovalent cations in relation to the divalent cations is important in determining dispersibility. The percent of sodium in a saturation extract is a good indicator of reliability. FIG. 2, from Mitchell shows this relationship. The present invention can be used to introduce divalent cations into clay soils as a means for increasing their resistance to dispersion. This has potential application to reduction of landslide hazards. Similarly, clay liners of waste holding ponds, heap leaching facilities, etc., may be treated so as to optimize their performance.

For these applications electrode placement and electrolyte would be dependent on any specific application and type of soil to be modified. These details can be specified by anyone practiced in the art, based on the known theory and specification of soil properties and chemistry.

At times it may be advantageous to introduce specific ion source solutions directly into the earth through hydrodynamic flow so as to place the ions near to materials to be modified or for reclamation. Applied electrical current may then be used to migrate desired ions from the more permeable regions where solutions will flow under pressure, to impermeable regions such as clay zones where fluid flow will not place the desired ions. In this embodiment of the present invention, the special CHIM electrodes might not be needed. Positioning of the electrodes so that any acid or base reaction fronts would not interfere with desired ion substitution processes is possible.

A principal advantage of this invention over prior art, is that it permits the controlled emplacement of selected ions, into the soil for purposes of waste remediation or modification of soil properties. Remediation of soil is often accomplished through hydrodynamic flow of soil fluids by pumping and/or by flushing of a non-contaminant fluid such as water. The flushing process is most effective in the permeable zones of the earth but little is accomplished in the impermeable regions.

The electromigration employed in this invention provides a means for moving ions into and out of impermeable zones of the earth, and permits the controlled introduction of any selected ion or ions into earth materials regardless of hydrodynamics. The prior art of electrical remediation suffered from concomitant hydroxide and hydronium ion emplacement in the earth and their consequences. This invention permits elimination of any undesired consequence of hydroxide or hydronium ion entry to soils and permits controlled entry of any selected ion species for control of the remediation process.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology terminology employed herein is for the purpose of description and not of limitation.

What is claimed is:

1. A method for introducing selected ions into a soil region without introducing either hydroxyl ions or hydronium ions comprising:

identifying in said soil region a soil cation to be replaced and a soil anion to be replaced;

introducing an anode comprising an inner compartment containing a first electrolyte, an electrode positioned in the inner compartment and at least partially submerged in the first electrolyte, an outer compartment, and a salt bridge separating the inner compartment from the outer compartment, said first electrolyte comprising an aqueous solution containing a replacement cation for said soil cation into said soil region;

introducing a cathode comprising an inner compartment containing a second electrolyte, an electrode positioned in the inner compartment and at least partially submerged in the second electrolyte, an outer compartment, and a salt bridge separating the inner compartment from the outer compartment, said second electrolyte comprising an aqueous solution containing a replacement anion for said soil anion into said soil region;

applying DC voltage across said anode and said cathode whereby said soil cation is replaced by said replacement cation and said soil anion is replaced by said replacement anion without the migration of hydroxide and hydronium ions into said soil region.

2. The method according to claim 1 wherein said anode comprises an anode membrane disposed between the aqueous solution containing said replacement cation and said soil region;

said cathode comprises a cathode membrane between the aqueous solution containing said replacement anion and said soil region.

3. The method according to claim 1 wherein the soil anion and soil cation are replaced by a member of the group consisting of a precipitated compound of the replacement cation and the soil anion, a precipitated compound of the replacement anion and the soil cation, and a combination of a precipitated compound of the replacement cation and the soil anion and a precipitated compound of the replacement anion and the soil cation.

4. The method according to claim 1 wherein the replacement anions migrating from the cathode replace the soil anions migrating into the anode, and the replacement cations migrating from the anode replace the soil cations migrating into the cathode.

* * * * *